United States Patent

Rendek et al.

[15] 3,700,847
[45] Oct. 24, 1972

[54] SYSTEM FOR CONTINUOUS PROCESSING OF VIENNA SAUSAGE USING MICROWAVE ENERGY

[72] Inventors: Robert B. Rendek, Hillside; Evan F. Binkerd, Downers Grove, both of Ill.

[73] Assignee: Armour & Company, Chicago, Ill.

[22] Filed: July 6, 1970

[21] Appl. No.: 52,504

[52] U.S. Cl. .................................. 219/10.55, 99/109
[51] Int. Cl. .............................................. H05b 9/06
[58] Field of Search ....................... 219/10.55; 99/109

[56] References Cited

UNITED STATES PATENTS

| | | |
|---|---|---|
| 2,766,125 | 10/1956 | Peschke .................. 99/109 X |
| 3,235,388 | 2/1966 | Francis ...................... 99/109 |
| 3,170,797 | 2/1965 | Sloan et al. .................. 99/109 |
| 3,537,385 | 11/1970 | Puschner ............ 219/10.55 X |
| 3,235,702 | 2/1966 | Timmermans et al. .. 219/10.55 |
| 3,457,385 | 7/1969 | Cumming ............... 219/10.55 |
| 2,973,277 | 2/1961 | Barnett et al. ............... 99/109 |
| 3,597,565 | 8/1971 | Johnson ................. 219/10.55 |
| 2,355,548 | 8/1944 | Musher ....................... 99/109 |

*Primary Examiner*—J. V. Truhe
*Assistant Examiner*—Hugh D. Jaeger
*Attorney*—Carl C. Batz

[57] ABSTRACT

A plurality of casings stuffed with vienna emulsion are conveyed simultaneously through a chamber for smoking and then through a microwave heat applicator which cooks the sausage. The sausage strands are then chilled, peeled and cut to size for packaging. All of the processing from smoking to cutting is performed continuously on a plurality of long stuffed casings conveyed longitudinally through the processing apparatus or stations.

8 Claims, 6 Drawing Figures

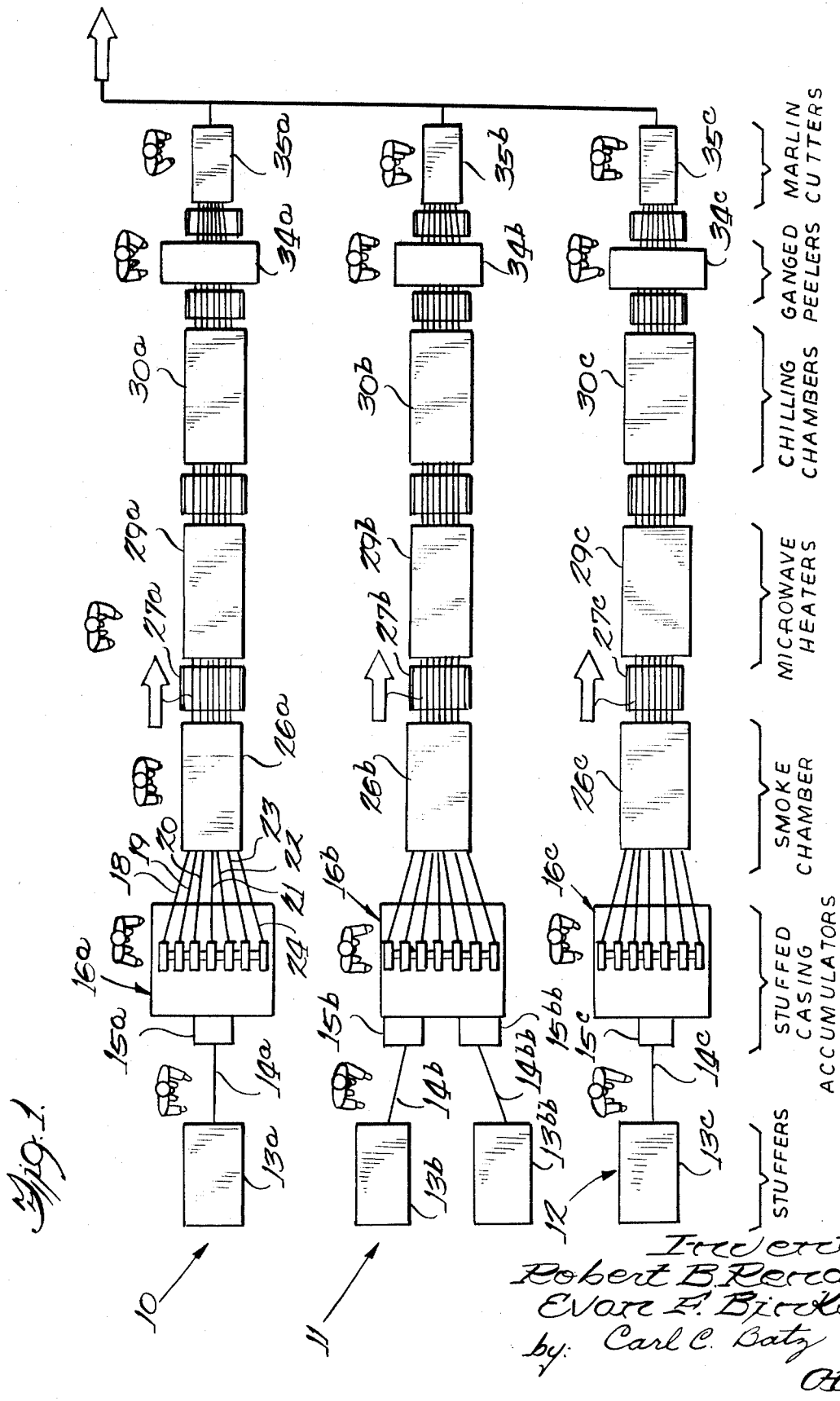

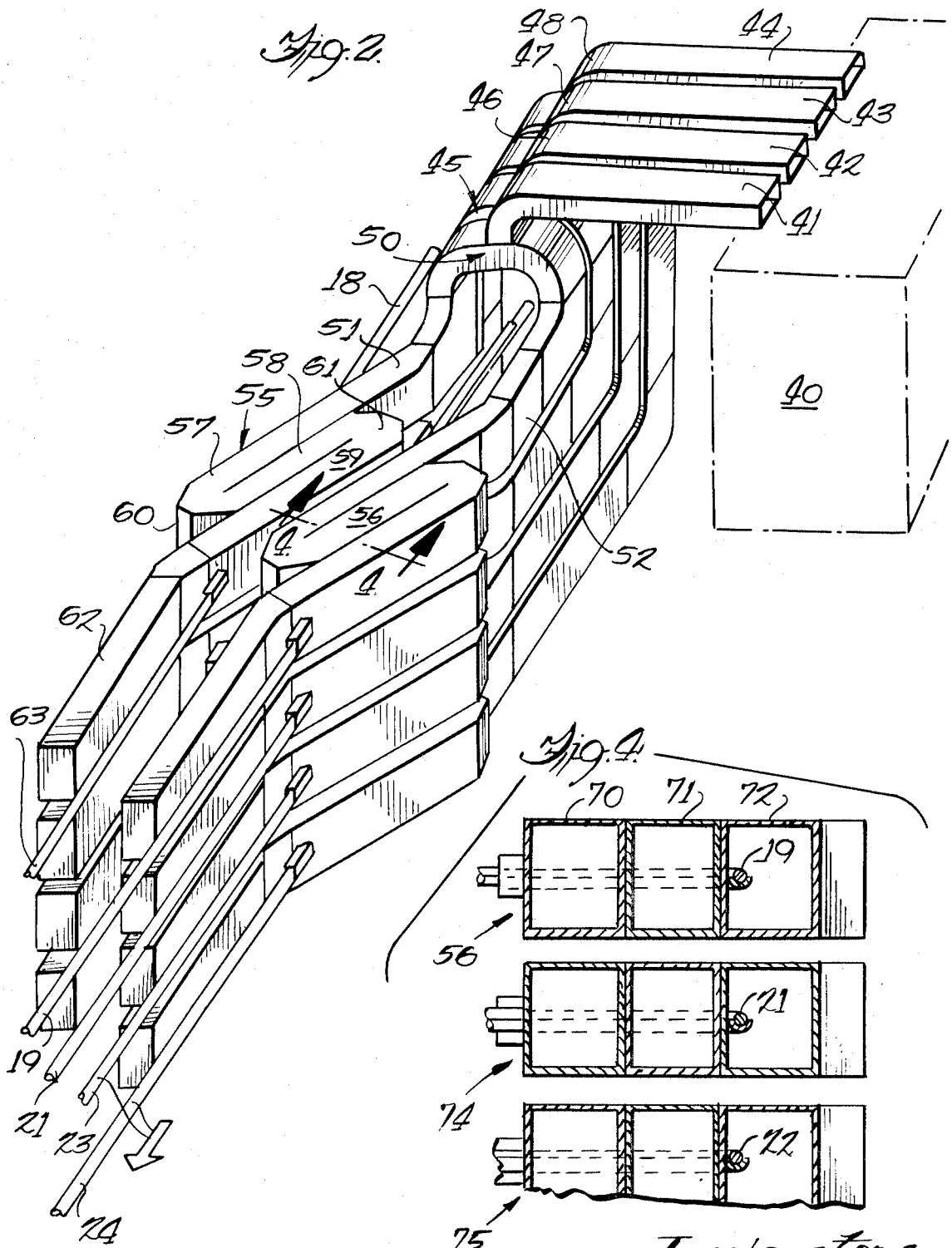

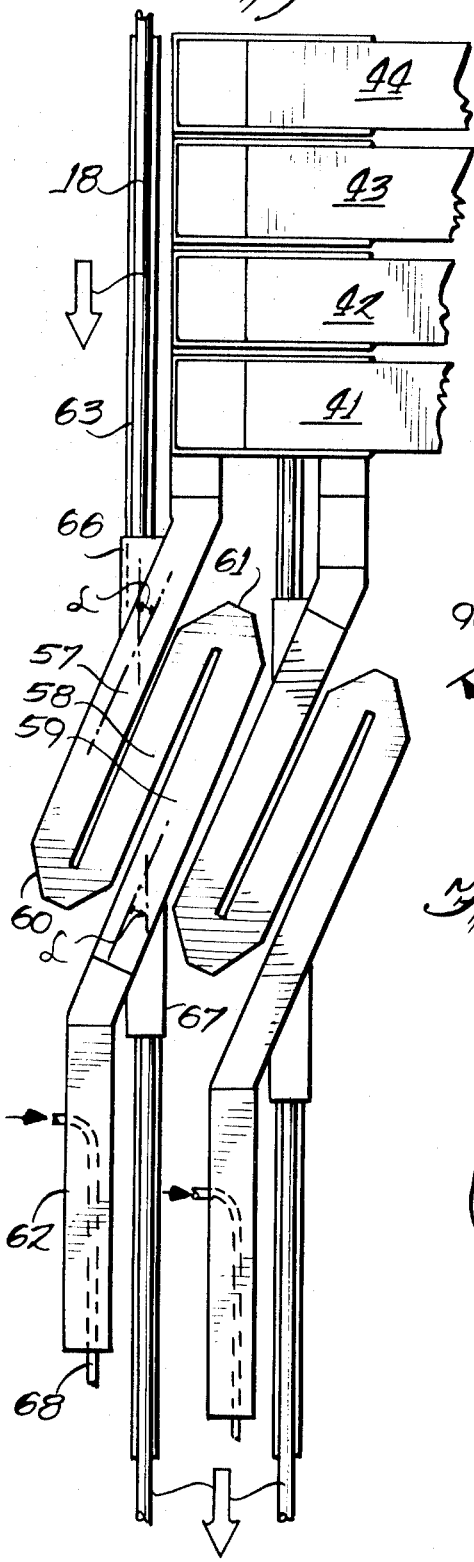
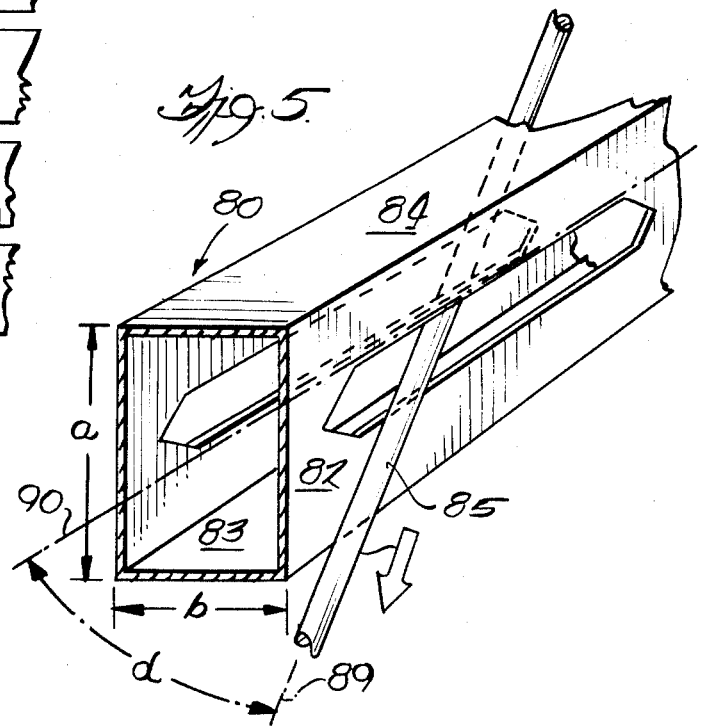
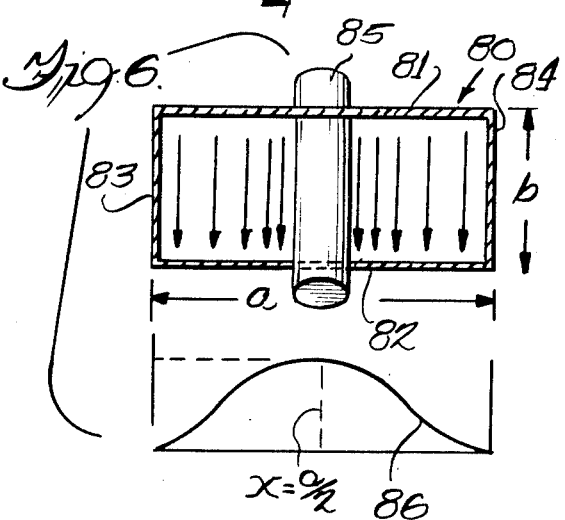

3,700,847

SYSTEM FOR CONTINUOUS PROCESSING OF VIENNA SAUSAGE USING MICROWAVE ENERGY

BACKGROUND OF THE INVENTION

1. Field of the Invention

The present invention relates to the processing of vienna sausage. Vienna sausage is normally composed of various parts of meat such as beef cheeks, boneless picnic portions, beef plates and beef trimmings to which are added a standard vienna spice, water and a brine formula. The meats are ground and then mixed with the brine, water and spice, and then comminuted to form an emulsion which is stuffed into casings.

2. Description of the Prior Art

In the prevailing method of commercially producing vienna sausage, the vienna emulsion is stuffed into a long casing which may be as long as 160 feet in length. The stuffed casings are then placed on horizontal support bars called smoke sticks. The smoke sticks supporting the emulsion are placed on a transporting means called a "cage" which is normally supported by an overhead trolley. The stuffed casings are looped about the smoke stick in such a fashion that the distance from the bottom of the loop to the support bar is about 28 in. The casing becomes crimped at top and bottom because the stuffed casings contain fresh meat at this time and they are soft. Thus, individual links of 28–30 in. are formed due to the draping of the longer stuffed casings over the smoke sticks. A number of the longer stuffed casings are contained in a cage which then becomes the transport mechanism for subsequent smoking, cooking (by conventional heated air) and chilling.

Heating and chilling of the emulsion within the casing causes it to become firm so that when the casing is removed, the emulsion fractures at the points where the casing had been crimped. Thus, the 28 in. links become separate into individual pieces after peeling of the casing from the emulsion.

The 28 in. links are gathered in bins and transferred to cutters where operators gather seven of the 28 in. links into a cutter and simultaneously cut all seven links into pieces approximately 2 ¼ in. long. The group of seven pieces is then packaged. Because of the need to gather the 28 in. links for feeding into the cutters, it normally requires about four operators to man each cutter under full production. Further, after each of the groups of seven links are cut, there are left small end pieces or scrap ranging from sliver slices to approximately 2 inches. These pieces are gathered and then fed back into a new mixture of emulsion for reprocessing.

SUMMARY OF THE INVENTION

In the present invention, shirred casings are stuffed in their full lengths (approximately 160 feet). The stuffed casings are accumulated in an accumulating device which may take the shape of a cylindrical form about which a stuffed casing is wrapped. In normal operation, seven continuous stuffed casings are fed from the accumulator station through the production line. The stuffed casings are moved longitudinally as they are delivered from the accumulators; and they are placed adjacent each other in a group of seven as they pass through a smoke chamber and into a microwave applicator for cooking. The casings are uninterruptedly fed in a longitudinal direction (i.e. axial of the casing) into chambers where they are chilled. During and after heating, the emulsion being processed is preferably supported by a conveyor. After chilling, the casings are peeled from the emulsion and all seven casings are then fed into a cutter where they are cut in the 2 ¼ in. lengths for packaging. As one 160 foot length of stuffed casing runs out at an accumulator, a subsequent length is knotted to it to join the ends, so that the stuffed casing is continuously fed without interruption. The invention eliminates the problem of requiring a large number of operators to gather the individual smaller links (that is, 28-inch lengths) from the peelers for feeding into the cutters. In addition, the present invention significantly reduces the scrap produced heretofore when cutting the 28-inch links prior to packaging.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a plan view, partially in block schematic form, of three parallel lines for processing vienna sausage according to the present invention;

FIGS. 2 and 3 are a perspective and a plan view respectively of a preferred microwave applicator system used in the present invention;

FIG. 4 is a transverse cross sectional view taken through the sight line 4—4 of FIG. 2; and FIGS. 5 and 6 are close-up perspective and transverse cross sectional views of an individual applicator section respectively.

DETAILED DESCRIPTION

Referring first to FIG. 1, there are shown in block schematic form three parallel processing lines (generally denoted 10, 11 and 12) for vienna sausage according to the present invention. The stuffed casings move from left to right in each line in the direction of the large hollow arrows. Except for the placement of the sausage stuffers, as will be explained presently, the processing lines are similar; hence, identical elements in each of the lines will be designated by a numeral together with a letter *a*, *b* or *c* respectively for the lines 10, 11 and 12.

For the illustrated embodiment there are four sausage stuffers designated 13*a*, 13*b*, 13*bb* and 13*c* respectively. Each of the stuffers 13*a*, 13*b*, 13*bb* and 13*c* may be of the type which are commercially available under the trademark Viennamatic, as manufactured by the Townsend Engineering Company of Des Moines, Iowa. Each of the stuffers is provided with a bulk of vienna emulsion and stuffs it into a shirred casing which, when expanded, may be as long as 160 feet.

The particular composition of the vienna emulsion is not important as it is generally known that such emulsions may include beef cheeks, boneless picnic pieces, beef plates and beef trimmings to which are added a vienna spice which may be pre-packaged.

To this, there is added water and a brine formula having a high salt content thus making the emulsion a lossy product with respect to incident microwave energy. The resultant emulsion is chopped and then comminuted before stuffing. The stuffers will pack the emulsion into casings which themselves are highly penetrable to microwave energy — for example, reconstituted collagen casings or cellulose casings. The particular size of the casing also is not critical. However, a fairly uniform stuffed diameter should be achieved. Further, as already mentioned, the casings are normally provided in a shirred state so that they extend for a length of only about 12 inches prior to being expanded during stuffing.

The stuffed casings emanating from the stuffers are diagrammatically depicted by the lines 14a, 14b, 14bb, and 14c respectively; and each of these stuffed casings is continuously fed onto an accumulator (which may be a drum or cylinder) so as to store the formed sausage without crimping it. Alternatively, the stuffed casings may be taken from the stuffers and wound into uniform coils in a bin. The bins then become the accumulators which are moved to the input of the smoke chamber as required. Thus, the stuffed casing 14a is wound on an accumulator generally designated by reference numeral 15a.

Each of the processing lines 10, 11 and 12 are provided with an accumulating station designated respectively 16a, 16b and 16c at which there are seven drums of stuffed casings. The seven stuffed casings are processed together in each assembly line because each packaged container of the finished product contains seven individual links of sausage which, as already mentioned, are usually 2 ¼ in. long. Thus, seven stuffed casings are conveyed longitudinally from their respective accumulators originating at the accumulating station 16a; and these are designated respectively 18–24. The stuffers are capable of stuffing sausage casings at a much higher rate than the rate at which the stuffed casings are fed longitudinally through the processing line from the accumulating station; however, one of the stuffers 13b, 13bb may be considered to be a standby stuffer. That is, the stuffer 13b may easily be shifted to provide accumulated sections of stuffed casing for the line 10 if needed; and similarly, the stuffer 13bb may be readily shifted to provide accumulated stuffed casings for the line 12.

An operator at the accumulating station 16a replaces each of the drums of casing when it is emptied with a similar drum provided from the stuffer 13a; and the end of one stuffed casing may simply be tied to the beginning of the subsequent casing for continuity because at least for a portion of the processing line the stuffed casings are supported by the casings themselves — that is, they need not be fed onto a conveyor.

From the accumulator station the stuffed casings 18–24 are moved through a smoke chamber 26a. The smoke chamber 26a may be a closed chamber equipped with conveyors for supporting and moving the casings. Natural smoke is discharged into the chamber for smoking. The natural smoke may be generated by a smoke generator such as that commercially available under the trademark Kart Ridg Pak. Alternatively the smoking may be accomplished with a liquid smoke solution by showering, spraying or immersing the stuffed casings as they pass through the smoke chamber.

After the stuffed casings are smoked, they are directed onto a conveyor 27a which supports the casings and feeds them through a microwave applicator 29a. A more complete description of the microwave applicator is presented below. It will be appreciated that the schematic showing of FIG. 1 illustrates all of the casings being in a common horizontal plane, whereas in fact the casings may actually be aligned in two vertical planes, as will be made clear in subsequent discussion.

While still being supported by a conveyor, the cooked emulsion, still in the casing, is fed through a chilling chamber 30a wherein a spray of cold water or refrigerated brine removes excess heat from the emulsion. It is preferred to use a metal mesh conveyor for transporting the casings through the chilling apparatus, whereas a low loss material such as Mylar is preferred for the microwave applicator.

While still being supported, all seven casings are then fed into a set of seven commercially available peelers, diagrammatically shown at 34a. The peelers 34a continuously strips the casing from the cooked emulsion, and the sausages are then fed into a cutter 35a where all seven parallel casings are aligned and sliced transversely to provide a group of seven links each having a length of about 2¼ in. and ready for stuffing into a jar or can. Thus, as seen in FIG. 1, the output of all of the cutters 35a–35c is sent to retorts for packaging. The cutters 35a–35c may be of the type currently known in the trade as Marlin cutters adapted to receive the sausages which are longer than the 28 in. length as is now common.

Turning now to the microwave applicator, a more complete description is presented in a copending, co-owned application of Ray M. Johnson entitled "System For Applying Microwave Energy to a Lossy Cylindrical Object" filed July 6, 1970 Ser. No. 52,505. Persons skilled in the art will appreciate that the present invention is not limited to the specific applicator to be described although the applicator does have many advantages over any others commercially available because these others are not well suited for uniformly heating the surface of an object which is cylindrical.

Turning now to FIG. 2, reference numeral 40 generally designates a source of microwave energy shown schematically in phantom. In the illustrated embodiment, there are eight separate individual applicator sections energized by the source 40. That is, the individual applicators are grouped in pairs and each pair is then energized from a common feed wave guide. Because the present invention contemplates that only seven stuffed casings be treated per processing line, one of the individual applicators may have a dummy load or the design may be altered from that which is illustrated so that one of the feed wave guides does not energize two separate applicators.

The feed wave guides are designated respectively 41, 42, 43 and 44.

The feed wave guides 41–44 are each formed into an elbow as at 45, 46, 47 and 48 respectively. Each of the elbows 45–48, in turn, feeds a "T" section to divide the incident microwave energy into two separate rectangular wave guides having metallic walls, each such guide feeding an applicator section. The "T" associated with the elbow 45 is generally designated by reference numeral 50 in FIG. 2, and it divides the incident microwave power to feed two rectangular wave guides 51 and 52. The other "T" sections fed by the guides 46-48 are similar to the "T" designated 50, and need not be described in further detail. Similarly, each of the other "T" sections associated with the guides 42-44 feed separate rectangular wave guides, each energizing a separate applicator. Hence, only the applicator sections energized by the wave guides 51 and 52 will be described in greater detail, it being appreciated that one of the guides may have a dummy load, as already explained. The individual applicator sections are stacked in two vertical columns of four, as best seen in the plan view of FIG. 3.

The two applicator sections fed by the wave guides 51 and 52 are generally designated respectively by reference numerals 55 and 56, each comprising a three-pass wave guide applicator wherein a continuation of its associated feed wave guide is formed into three folds about the broadwalls.

Thus, the applicator section 55 includes a first wave guide section 57, a second wave guide section 58, and a third wave guide section 59. The wave guide sections 57 and 58 are connected by means of a U-shaped coupling 60, and the wave guide sections 58 and 59 are connected by a similar U-shaped coupling 61. It will be observed that the side walls for each of the rectangular wave guide sections 57-59 as well as the U-shaped couplings 60 and 61 lie in a common plane and that the folds are made about the broadwalls. A termination section 62 is connected to the downstream (that is, relative to the direction of power flow) end of the applicator section 59. The stuffed casing 29, supported by a semi-cylindrical conveyor belt 63 having a low dielectric constant, such as Mylar passes through the broadwalls of each of the applicator sections 57-59 with the axis of the stuffed casing 29 located approximately at the midpoint of the broadwalls of these applicator sections. The axis of the stuffed casing 29 forms an angle of incidence, designated $\alpha$, with the axis of the wave guide section. Similarly, the stuffed casings 19-24 pass through separate wave guide applicator sections arranged to have the microwave power pass three times over the casing, as seen in FIG. 4 for the casings 19, 21 and 23.

The movement of the casings is in the direction of the hollow arrows in FIGS. 2 and 3, and the angle of incidence $\alpha$ is illustrated in FIG. 3.

Metallic input and output ports (which may be cut off tubes to prevent the radiation of the microwave energy) for the applicator section 55 are designated respectively by reference numerals 66 and 67 in FIG. 3, and the water load including a conduit 68 of low dielectric constant is provided in the termination section 62. Water is continuously fed through the conduit 68 for absorbing any power that may remain after the microwave energy leaves the final pass of the applicator, namely section 59.

The applicator section 56 which treats the casing 19 is similar to the applicator section 55 which has already been described. The three individual wave guide passes for the applicator section 56 are designated respectively by reference numerals 70, 71 and 72 in FIG. 4. The applicator sections treating the casings 21 and 23 are generally designated by reference numerals 74 and 75 respectively. For the three passes 70, 71 and 72 comprising the applicator section 56, as viewed in FIG. 2, the broadwalls are shown in a vertical disposition whereas the sidewalls extend horizontally in two vertically spaced planes. Power flows from the input feed section 41 through the elbow 45 and into the "T" section 50 where it divides and is coupled into the input sections 51 and 52 for the applicators 55 and 56 respectively. For the applicator 55, power flows first through the section 57 then through the U-shaped coupling 60, then through the section 58 and the U-shaped coupling 61 and into the final applicator section 59 and then into the termination section 62. Thus, it will be appreciated from FIG. 2 for the applicator section 56, power flows generally in the direction of movement of the casing 19 in the sections 70 and 72 whereas for the section 71; power flows generally in the direction against the movement of the casing 19 and its conveyor.

The theory of operation of the wave guide applicators is more fully disclosed in the above-identified copending, coowned application and it will only be briefly summarized here for purposes of clarifying the present invention. Referring first to FIG. 5, one section of a rectangular wave guide is shown in transverse cross section, and is generally designated by reference numeral 80. This section includes upper and lower broadwalls 81 and 82 and first and second sidewalls 83 and 84. The cylindrical object (namely, a stuffed casing) being treated is designated by reference numeral 85. The length of the broadwalls 81 and 82 is designated $a$; and the length of the sidewalls is designated $b$. The dimensions $a$ and $b$ may be constrained such that only the $TE_{10}$ mode is allowed to propagate in the wave guide. That is, the electromagnetic field vector extends only perpendicular between the broadwalls 81 and 82 as indicated by the arrows in FIG. 6, and the intensity of the electric field vector (represented by the ordinate of the graph) is indicated schematically by the curve 86 at the lower portion of FIG. 6 where the horizontal direction of the curve represents the distance along the broadwall.

It can be seen from FIGS. 5 and 6 that the stuffed casing 85 passes through the broadwalls 81 and 82 of the wave guide 80 with the axis of the casing 85 lying substantially in the plane of maximum field intensity (which extends perpendicular to the plane of the page of FIG. 6 and along the dashed line $x=a/2$). In FIG. 5 it is assumed that the microwave energy is propagating from the upper right hand corner to the lower left hand corner, and the axis of the casing 65 designated by the chain line 89 defines the angle $\alpha$ with the axis 90 of the wave guide 80.

As explained in greater detail in the above-identified copending, co-owned application, by passing the cylindrical object 85 through the broadwalls of the wave guide with its axis extending approximately in the plane of maximum field intensity in forming an angle $\alpha$ with the axis of the wave guide where $\alpha$ is preferably within the range of 15° to 80° depending upon the system parameters, a uniform heating of the object is accomplished.

The angle $\alpha$ is selected to reduce reflections of microwave energy back to the source while increasing the coupling of energy into the surface of the object and at the same time, to make the heating of the object more uniform about its surface. Although the angle of incidence $\alpha$ may be in the range 10°–80°, it is preferably within the range of 20°–50°, and it has been found that an angle of 26° has been most suitable. With the orientation of the axis of the stuffed casing relative to the axis of the wave guide as illustrated in FIG. 5 and as shown in FIGS. 2 and 3, the orientation of the electric field vector in a rectangular wave guide excited in a $TE_{10}$ mode for a cylindrical object effects the most uniform heating of the surface of the object thereby preventing uncooked portions and causing the emulsion to be more uniformly and more rapidly cooked. It has also been found that the three-pass applicator section shown in FIGS. 2–4 is most efficient in that 90–95 percent of the incident power is consumed thereby leaving very little unused power while avoiding the disadvantages of prior microwave systems which were multimode cavities or wave guides in which a standing wave was excited.

From the above description of the inventive processing line it can be seen that the number of operators is minimal, particularly with respect to the cutters. That is, whereas in prior processing of vienna sausage it required four operators to retrieve the 28 in. lengths of sausage from the peelers to place them in the cutters, by processing the casings continuously and moving them longitudinally through a microwave heating applicator the casings may be fed continuously and directly into the cutters. This also eliminates the scrap from the cutters. It will be recalled that for each set of 28 in. links there were seven pieces of scrap ranging from sliver slices to approximately 2 inches. With the present invention scrap pieces occur only at the ends of each 160-foot length.

In addition to the above advantages, our system, because it uses a microwave heating applicator greatly reduces the overall processing time for vienna sausage without fear of uneven or intermittent heating of the emulsion being processed. The stuffed casings may be conveyed along the processing lines at a speed of 50–75 feet per minute.

Having thus described in detail a preferred system for the processing of vienna sausage according to my invention, persons skilled in the art will be able to modify certain of the steps disclosed and to substitute equivalent elements for those which have been shown; and it is, therefore intended that all such modifications and substitutions be covered as they are embraced within the spirit and scope of the appended claims.

We claim:

1. In a method of processing a sausage emulsion containing meat, water and salt, the steps of stuffing said emulsion into a generally cylindrical casing of a length greater than the desired end product and which is penetrable to microwave energy, and while said casing and the emulsion contained therein is in unbroken cylindrical form moving said casing and its contained emulsion continuously and in the direction of its axis through a waveguide to rapidly cook said emulsion, and moving said casing containing cooked emulsion continuously through a peeler to remove the casing from the cooked emulsion as the sausage passes therethrough.

2. A method as set forth in claim 1 wherein said waveguide is excited in the $TE_{10}$ mode.

3. A method as set forth in claim 2 wherein said casing and the emulsion contained therein are passed through said waveguide in the plane of maximum intensity of field strength.

4. A method as set forth in claim 3 wherein said casing and the emulsion contained therein are passed in a direction which forms an angle of from 10° to 80° with the longitudinal axis of said waveguide.

5. A method as set forth in claim 4 wherein said angle is between 20° and 50°.

6. A method as set forth in claim 4 wherein said angle is about 26°.

7. A method as set forth in claim 1 including the step of passing said cooked emulsion continuously through a cutter to cut the same into pieces of uniform cylindrical shape.

8. A method as set forth in claim 7 wherein a plurality of said casings stuffed with said emulsion are passed concurrently through said waveguide, said peeler and said cutter without interruption whereby cooked emusion from all of said casings is cut simultaneously.

* * * * *